United States Patent Office 2,930,657
Patented Mar. 29, 1960

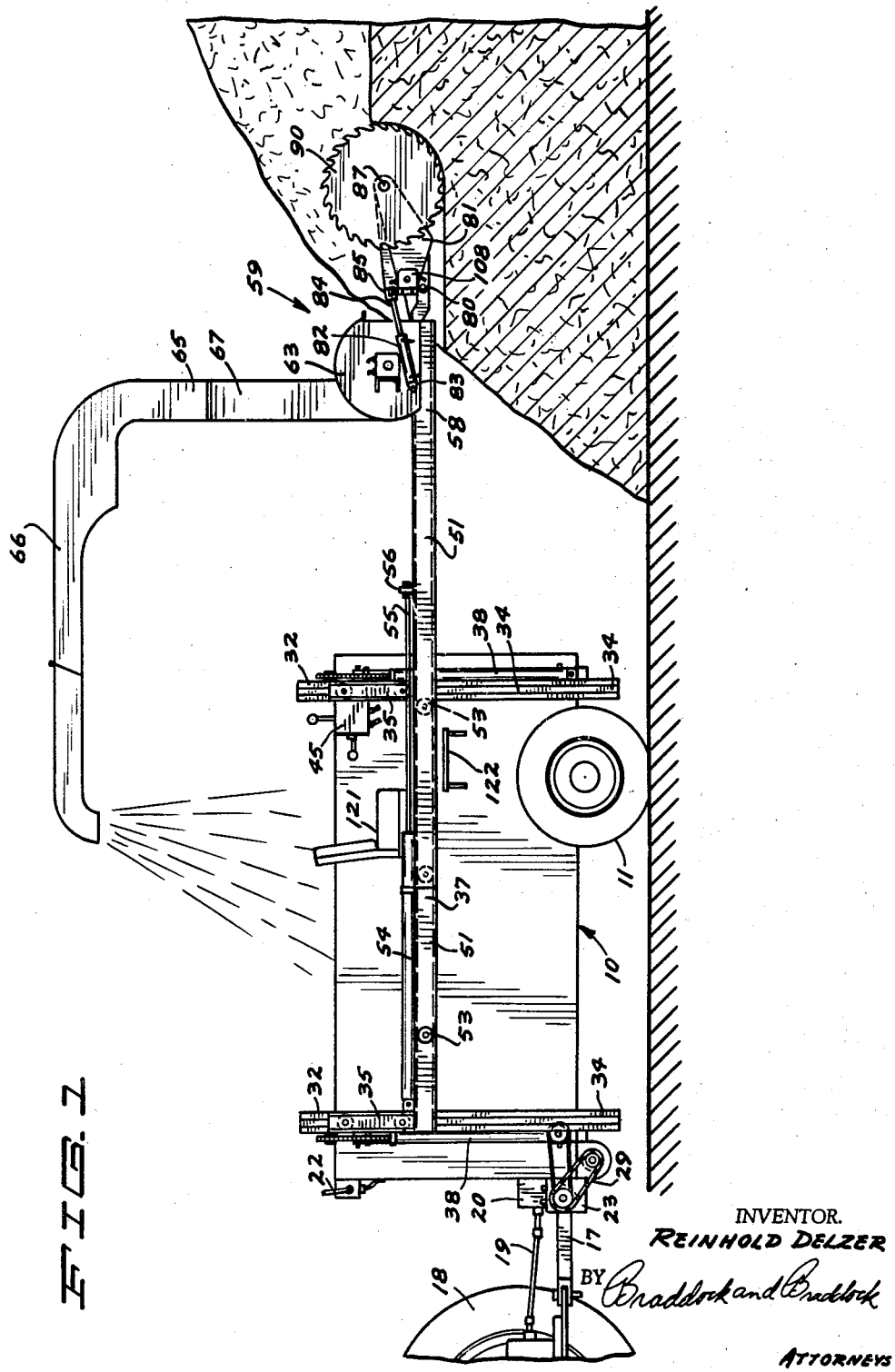

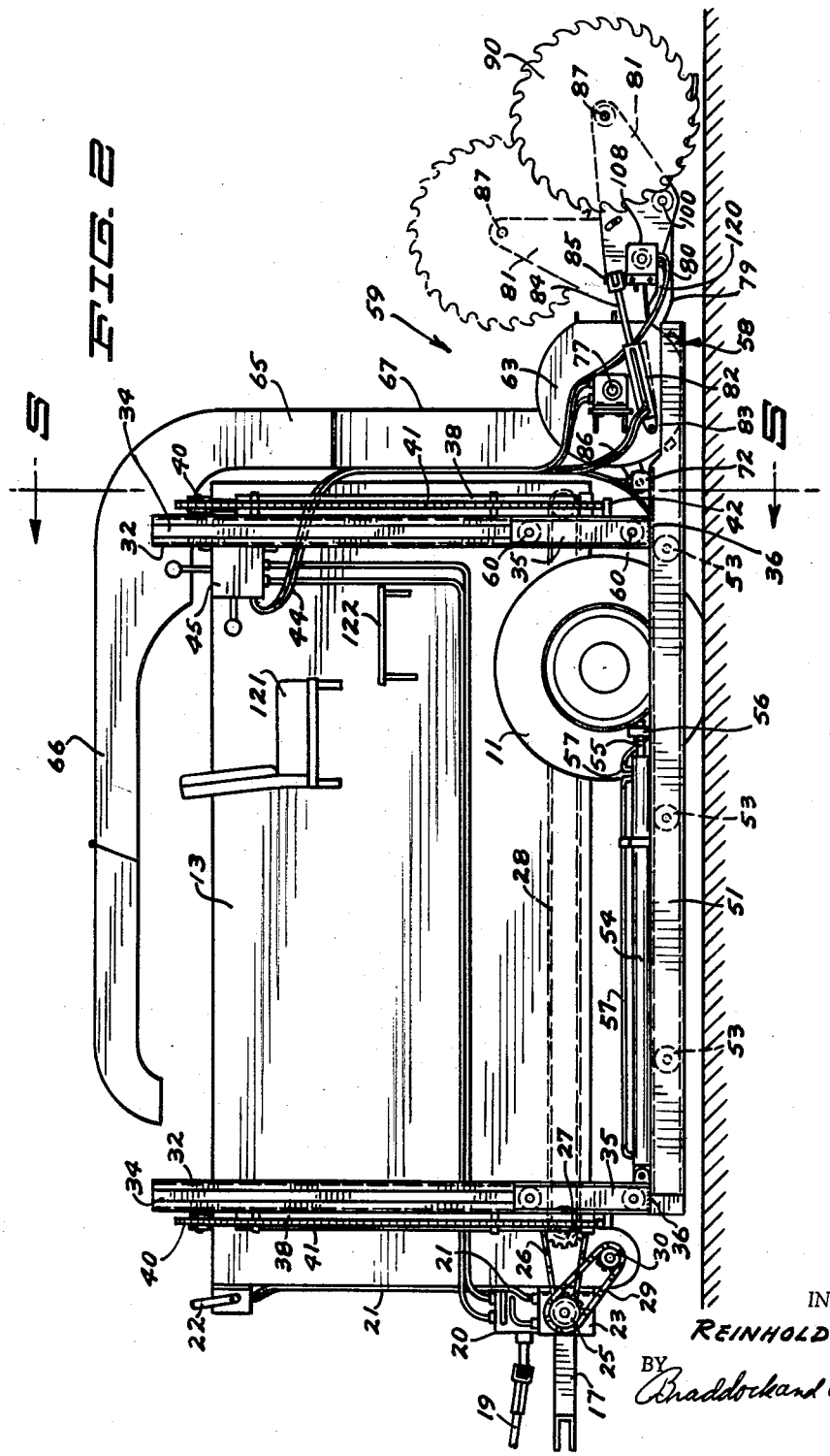

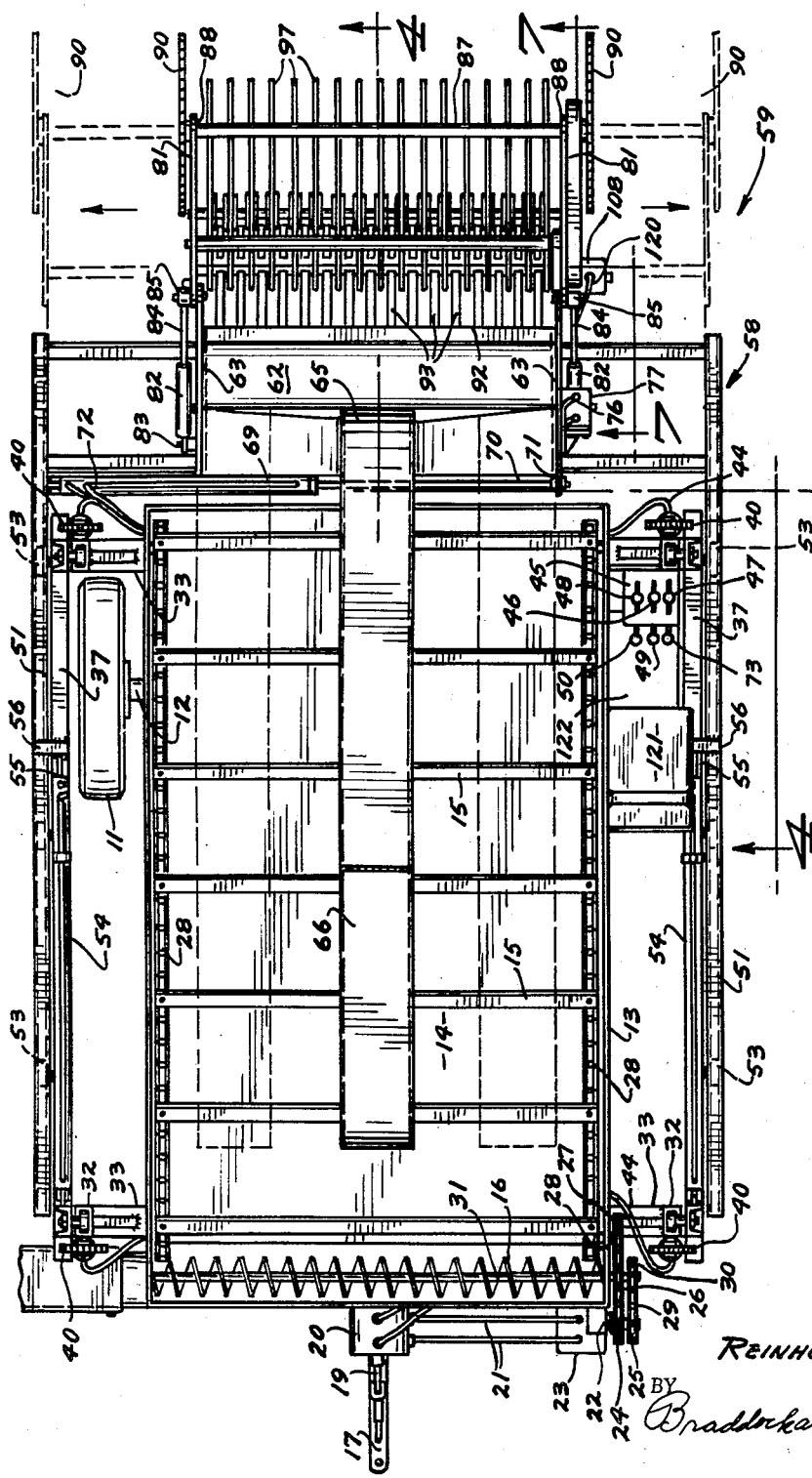

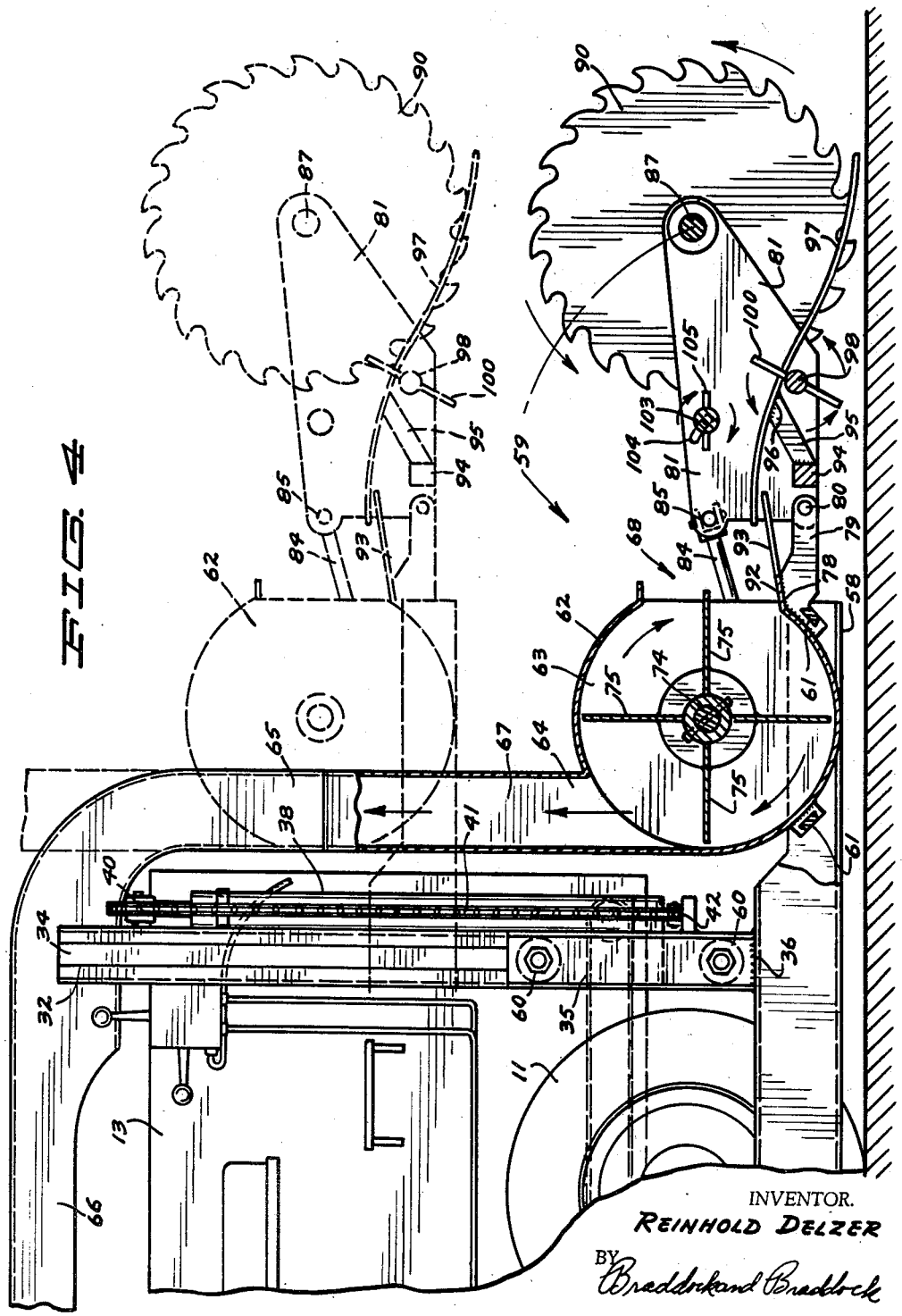

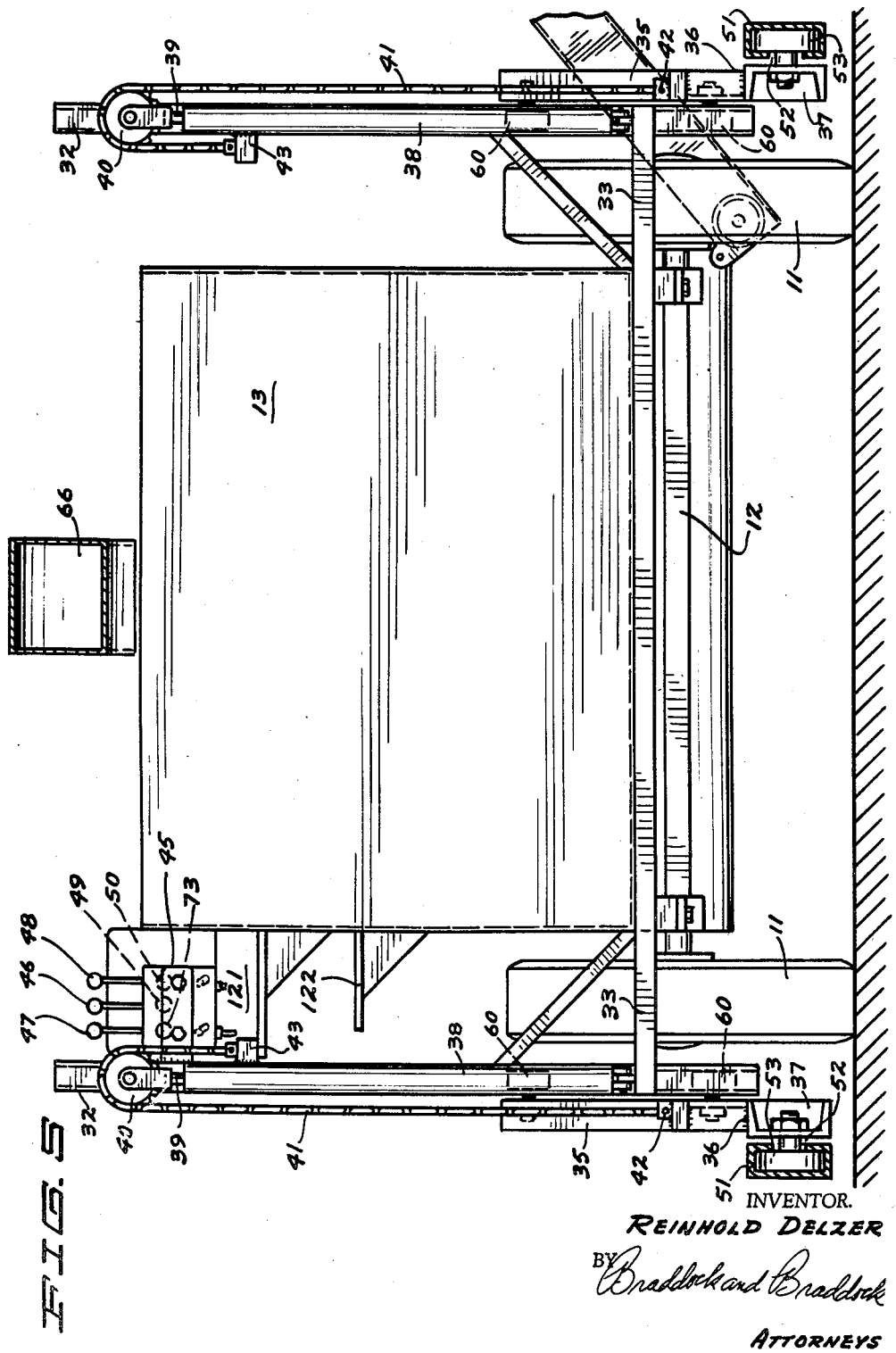

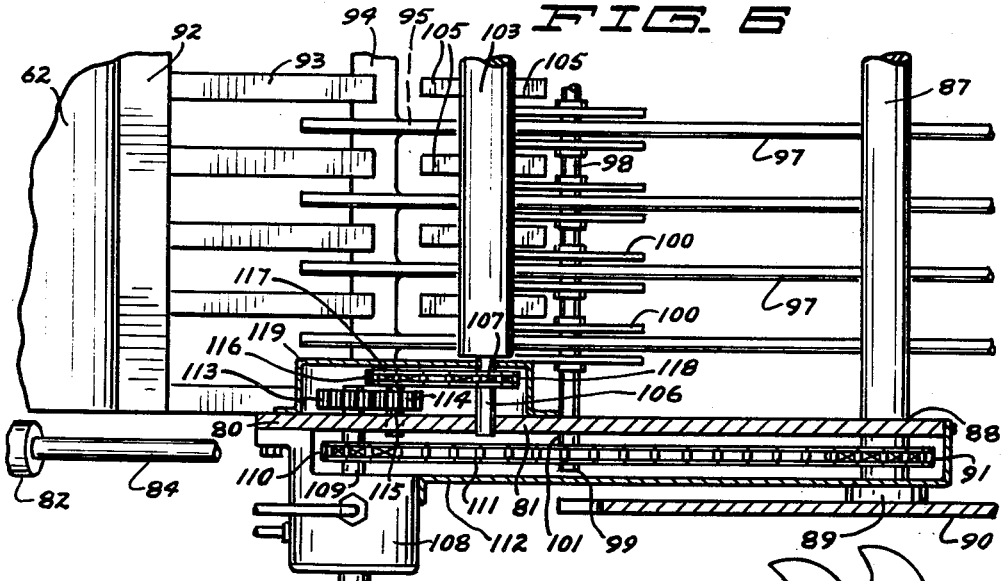
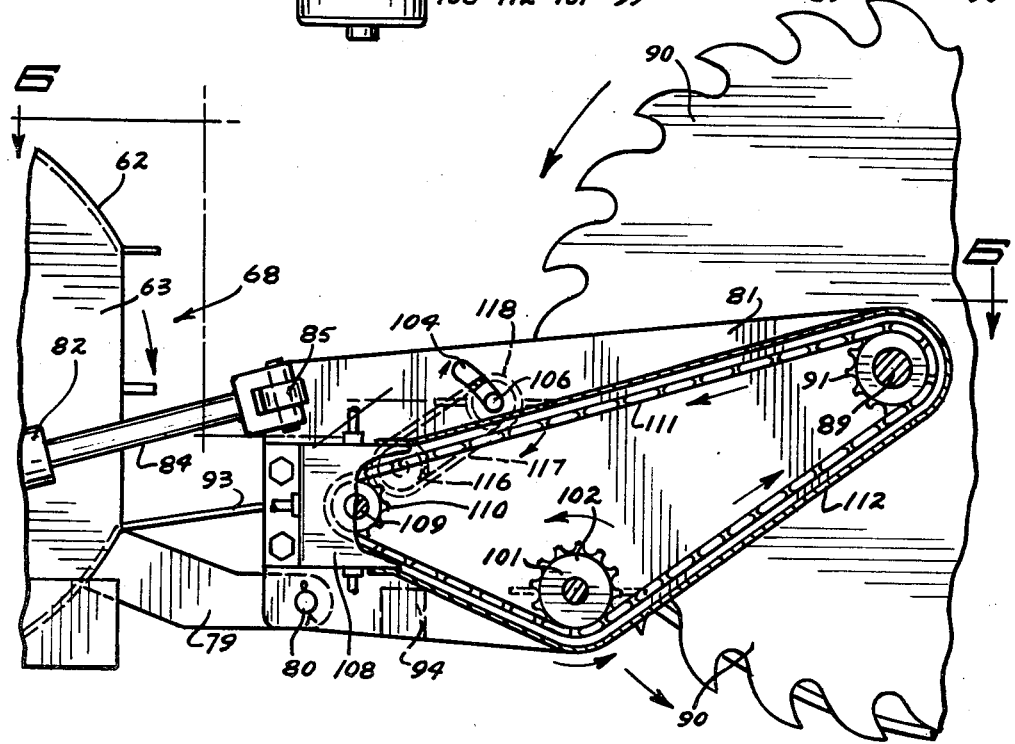

2,930,657

SILAGE LOADER

Reinhold Delzer, Douglas, N. Dak.

Application August 24, 1959, Serial No. 835,553

12 Claims. (Cl. 302—56)

The invention herein has relation to a silage loader constituted as a part of a vehicle such as a trailer assembly for picking up silage at a location where on the ground, or other surface, and transporting the silage to and depositing it at a location where to be stored, as in a silo.

It is customary to deposit silage on the ground in instances where in quantity greater than the capacity for storage in available silos, and to remove the silage from the ground piece meal fashion and place it in silos as storage space becomes available. Surplus silage usually is deposited on the ground in large piles which are in longitudinal alinement and confined between vertical walls at opposite sides, respectively, of the piles. A common procedure is to build up parallel side walls, of wood or other material, constructed to permit escape of water and spaced at distance apart sufficient to permit passage of trucks, or other vehicles, both to the accomplishment of depositing of silage on the ground between the side walls and removal of silage from the ground when to be stored. Another procedure for providing storage space between spaced, parallel bounding surfaces is to dig out ground to provide a longitudinal channel into which silage is to be deposited. Such procedure is, however, not too satisfactory by reason of the fact that there is lack of provision of drainage means.

The purpose of the present invention is to provide a loader for silage, or other material, wherein will be incorporated new and improved features and characteristics of construction and which will be operative in novel and improved manner.

In the accompanying drawings forming a part of this specification,

Fig. 1 is a side elevational view of a silage loader made according to the invention with parts thereof situated as when loading silage at position spaced above the ground and in more or less remote relation to a supporting vehicle of or for the silage loader;

Fig. 2 is an enlarged side elevational view of the disclosure of Fig. 1 with parts of the silage loader situated as when loading silage at position adjacent to the ground and in closer relation to said supporting vehicle;

Fig. 3 is a top plan view of the disclosure of Fig. 2;

Fig. 4 is an enlarged fragmentary vertical sectional view, taken substantially on line 4—4 in Fig. 3;

Fig. 5 is an enlarged vertical sectional view, taken on line 5—5 in Fig. 2;

Fig. 6 is a fragmentary vertical sectional view, taken substantially as on line 6—6 in Fig. 7; and Fig. 7 is an enlarged fragmentary sectional view, taken substantially on line 7—7 in Fig. 3.

In the disclosure as made, the silage loader is constituted as a part of a trailer assembly which also incorporates a generally rectilinear storage box for silage, and said silage loader is equipped to be capable of removing silage from the ground; on which it may have been stored for an extended period, as throughout a winter, thus to have become a hard solid mass; and depositing the removed silage into said storage box.

A chassis of a trailer 10 of or for the silage loader is suitably and conveniently supported by right and left wheels, each denoted 11, at opposite sides, respectively, of said silage loader, rotatably mounted on a cross beam 12 rigid with a rearward portion of said chassis. The chassis suitably and conveniently supports a rectilinear storage box 13 closed at its bottom by a floor 14 and open at its top. Longitudinally spaced, transversely extending flights, each represented 15, ridable on the floor 14 are to be operable, moved forwardly of the storage box, to deliver silage or other material to a transverse screw propeller 16 in the forward end of the box whence the silage or material can be conveyed to a location where to be stored, such as a silo.

The trailer 10 is to be connected, as by a hitch 17, to a tractor 18 for pulling and pushing said trailer, and a power take-off 19 of the tractor is for actuating a pump 20 on a vertical transverse forward wall of the storage box 13 rigid with the chassis.

Hoses 21 lead from the pump 20 by way of a control station with control lever 22 to an hydraulic motor 23 for actuating the flights 15 and the screw propeller 16 through the instrumentality of sprocket wheels 24 and 25 fixed on a shaft of said hydraulic motor.

A sprocket chain 26 riding the sprocket wheel 24 also rides a sprocket wheel 27 for propelling continuous sprocket chains 28 for advancing the flights 15 in any ordinary or preferred manner forming no part of the present invention, and a sprocket chain 29 riding the sprocket wheel 25 also rides a sprocket wheel 30 fixed on the shaft 31 of said screw propeller.

The silage loader includes four vertical posts, each indicated 32, located adjacent to the four corners, respectively, of the storage box 13, rigidly supported, as at 33, upon the external surface of the vertical side wall of said storage box to which adjacent. Each vertical post 32 provides an exteriorly facing vertical T-slot guide 34 for receiving spaced rollers 60 rigidly supported by and disposed longitudinally of a corresponding vertical slide 35. The lower ends of the vertical slides 35 at each of the opposite sides, respectively, of the storage box 13 fixedly support, as at 36, horizontal, longitudinal extending supporting beams 37.

The supporting beams 37 are to be raised and lowered while maintained in horizontal and transverse alinement. Mechanism for accomplishing raising and lowering of said supporting beams includes a vertical cylinder 38 rigid with a side surface of each vertical post 32, a piston 39 in each cylinder, a sprocket wheel 40 on the upper end of the rod of each piston and a sprocket chain 41 riding each sprocket wheel 40. Each sprocket chain 41 has a lower end thereof secured, as at 42, to an intermediate portion of the corresponding vertical slide 35, and an upper end thereof secured, as at 43, to an intermediate portion of the corresponding vertical cylinder 38.

Hoses 44 lead by way of a control station 45, with control levers 46, 47, 48, 49, 50 and 73, from the pump 20 to the vertical cylinders 38, respectively. The control lever 46 is to be manipulated to a first position to cause fluid under pressure to be forced into all of the vertical cylinders 38 beneath the pistons 39 when the supporting beams 37 are to be elevated and supported in any elevated position which may be selected and to a second position to cause pressure to be relieved in said vertical cylinders thus to permit said supporting beams to become lowered by gravity and cause them to be retained in any lowered position which may be selected. The construction and arrangement will be such that vertical movement of the pistons 39 and the sprocket wheels 40 thereon for a certain distance will result in vertical movement of the lower ends of the sprocket chains 41 and the supporting beams 37 thereon for twice said certain distance.

Each of horizontal, longitudinally extending boom members 51 of the silage loader, one at the exterior side of each supporting beam 37, is constructed to provide an interiorly facing T-slot guide 52 for receiving spaced rollers 53 rigidly mounted on and disposed longitudinally of the supporting beam 37 at the same side of said silage loader.

The boom members 51 are to be slid longitudinally of the supporting beams 37, while maintained in alinement transversely of the silage loader. Mechanism for accomplishing forward and rearward longitudinal movement of each boom member includes a longitudinal horizontal cylinder 54 pinned to the forward vertical slide 35 and secured to the supporting beam 37 at the same side of said silage loader, a piston 55 in each longitudinal horizontal cylinder and a piston rod in each piston fixedly secured, as at 56, to the boom member 51 slidably mounted on the spaced rollers 53 carried by the corresponding supporting beam.

Hoses 57 lead by way of the control station 45 from the pump 20 to the horizontal cylinders 54, respectively. The control lever 47 is to be manipulated to a first position to cause fluid under pressure to be forced into both of the longitudinal horizontal cylinders 54 at the forward sides of the pistons 55 when the boom members 51 are to be forcibly slid rearwardly and to a second position to cause fluid under pressure to be forced into said longitudinal horizontal cylinders at the rearward sides of said pistons when said boom members are to be forcibly slid forwardly. The construction and arrangement will be such that the boom members 51 can be moved to and maintained in any adjusted position longitudinally of the supporting beams 37 which may be selected.

Rearward end portions of the booms 51, disposed rearwardly of the storage box 13 and the rear vertical posts 32 in spaced relation thereto, fixedly support a pair of longitudinally spaced, parallel transverse members constituting a lateral support 58 for an intake assembly, indicated generally at 59, of the silage loader.

The spaced, parallel transverse members of the lateral support 58 suitably and conveniently, mount, as at 61, a blower housing 62 for sliding movement transversely of the silage loader and longitudinally of said lateral support. The blower housing includes a body of hollow cylindrical configuration bounded at its opposite ends by parallel walls, each denoted 63, in perpendicular relation to said body. The upper forward side of the body of the blower housing is open, at 64, to the lower end of a vertical arm 65 of an L-shape discharge spout the upper end of which is open to the rearward end of a forwardly extending horizontal arm 66 of said discharge spout the forward end of which will at all times be in vertical alinement with the upper open side of the storage box 13. The lower ends of the opposite side walls 67 of the vertical arm 65 are in meeting relation with upper portions of the opposite end walls 63, respectively, of the blower housing and lower end portions of said opposite side walls converge upwardly. Stated differently, an upper end portion of said vertical arm is of rectilinear configuration in cross-section, as is also the horizontal arm 66, and opposite side walls of a lower portion of the vertical arm are flared outwardly from an intermediate portion of the vertical arm where of rectilinear configuration to locations where in meeting relation to opposite end walls 63, respectively, of the blower housing. The rearward portion of the body of the blower housing is open for its full length, as at 68, and, save for said opening 68 and the opening 64 to the discharge spout said blower housing is closed.

Mechanism for accomplishing sliding movement of the blower housing 62, with appurtenances, transversely of the silage loader and longitudinally of the lateral support includes a transverse horizontal cylinder 69 pinned to a forward end portion of one of the boom members 51 and secured to an intermediate portion of a side surface of one of the transverse members of the lateral support 58, a piston 70 in said horizontal cylinder and a piston rod on said piston fixedly secured, as at 71, to the end wall 63 of the blower housing 62 at the end thereof opposite the boom member to which the horizontal cylinder 69 is pinned.

Hoses 72 lead by way of the control station 45 from the pump 20 to the horizontal cylinder 69. The control lever 48 is to be manipulated to a first position to cause fluid under pressure to be forced into the hollow cylinder 69 selectively at either side of the piston 70 when the blower housing 62, with appurtenances, is to be forcibly slid longitudinally of the lateral support. The construction and arrangement will be such that said blower housing can be moved to and maintained in any adjusted position transversely of the silage loader and longitudinally of the lateral support which may be selected.

The opposite end walls 63 of the blower housing 62 rotatably support a driven shaft 74 in concentric relation to the cylindrical body of said blower housing, and propeller blades 75, fixed on said driven shaft within the blower housing, are to be rotated in the direction indicated by the arrow in Fig. 4 of the drawings. There are four propeller blades 75, spaced at ninety degrees apart, fixed on the driven shaft 74 in the disclosure as made.

Hoses 76 lead from the pump 20 by way of the control station 45 to an hydraulic motor 77 for rotating the driven shaft 74 together with the propeller blades 75 as a unit. A driven shaft of said hydraulic motor will be connected to the blower shaft 74. The lever 49 at said control station will be manipulatable to a first position to establish communication between the pump 20 and the hydraulic motor 77 when the blower is to be operative and to a second position to shut off communication between said pump and said hydraulic motor when operation of said blower is to be discontinued.

A lower rearward portion of the blower housing 62 fixedly supports, as at 78, transversely spaced, parallel, rearwardly extending arms, each represented 79, and the rearward ends of said rearwardly extending arms, respectively, rotatably support, as at 80, forward lower portions of transversely spaced, parallel, vertical plates 81, constituted as parts of the intake assembly 59, for swinging movement in a vertical plane. The vertical plates 81 are suitably and conveniently secured to each other, in the same horizontal plane, by forward and rearward cross shafts.

Mechanism for causing the vertical plates 81, with appurtenances, to be swung upwardly and downwardly, about the pivotal supports 80 as axes, includes longitudinal cylinders 82 rotatably pinned, as at 83, to opposite end walls, respectively, of the blower housing and an upwardly and rearwardly extending piston 84 in each cylinder having its rod secured, as at 85, to the forward upper portion of the vertical plate 81 at the corresponding side of the silage holder.

Hoses 86 lead from the pump 20 by way of the control station 45 to the longitudinal cylinders 82, respectively. The control lever 50 is to be manipulated to a first position to cause fluid under pressure to be forced into both of the longitudinal cylinders 82 at the rearward sides of the pistons 84 when the vertical plates, with appurtenances, are to be swung upwardly and supported in elevated position and to a second position to cause pressure to be relieved in said longitudinal cylinders thus to permit said vertical plates, with appurtenances, to become swung downwardly by gravity to any selected lower position in which the vertical plates are to be retained.

Opposite end portions of a transversely extending, horizontal shaft 87 are rotatably mounted, as at 88, in the rearward ends of the vertical plates 81, respectively, and extensions 89 of said transverse shaft, one situated at the exterior side of each vertical plate, fixedly support vertical rotary cutters, each indicated 90, disposed longitudinally of the silage loader and including serrated peripheries. One of the extensions 89 fixedly supports a sprocket wheel 91, between the vertical plate and the rotary cutter at the same side of said silage loader, by employment of which the transverse shaft 87, together with said rotary cutters as a unit, can be rotated, in the direction of the arrows, in Figs. 2, 4 and 7 of the drawings.

A slotted apron 92, integral with and extending rearwardly and upwardly from the rearward side of a lower portion of the blower housing 62 in contiguous relation to the opening 64, includes longitudinally extending, transversely spaced, straight finger pieces 93 at the rear thereof, between the rearwardly extending arms 79, the rearward ends of which terminate above and substantially in the vertical planes of the rearward ends of said rearwardly extending arms.

The opposite ends of a transverse bar 94, disposed rearwardly of the rearwardly extending arms 79, are fixedly secured, as by welding, to forward lower internal surfaces of the vertical plates 81, respectively, and longitudinally extending, transversely spaced, straight bracket members 95 integral with said transverse bar extend rearwardly and upwardly therefrom. The rearward upper ends of said bracket members are in alinement transversely of the vertical plates 81 at lower intermediate portions thereof, as well as situated somewhat rearwardly and at about the elevation of the rearward ends of the finger pieces 93 of the slotted apron 92. The rearward upper ends of the bracket members 95 integrally support, as at 96, intermediate portions of the lower surfaces of longitudinally extending, transversely spaced, curvilinear tynes, each represented 97. A forward end portion of each tyne 97 is between, in spaced relation to and at elevation above the forward end portions of finger pieces 93 which are in adjacent relation, the curvilinear tynes extend rearwardly and downwardly on smooth curves to forward intermediate portions thereof where integral with the bracket members 95, respectively, portions of the curvilinear tynes at the rear of said bracket members extend downwardly and rearwardly on smooth curves, and rearward lower ends of said curvilinear tynes terminate at the rear of a transverse plane passed vertically through the transverse shaft 87 and forwardly of the rearward portions of the peripheries of the rotary cutters 90. The curvilinear tynes 97 also are in alinement transversely and the rearward lower ends thereof are situated substantially at the elevation of lower portions of the peripheries of said rotary cutters.

Opposite end portions of a transversely extending, horizontal shaft 98 are rotatably mounted, as at 99, in intermediate lower portions of the vertical plates 81, rearwardly of the bracket members 95 and at elevation below intermediate portions of the curvilinear tynes 97, and lower feed fingers 100 integral with said horizontal shaft are to be rotated therewith as a unit in the direction of the arrows in Fig. 4. Exterior portions of the lower feed fingers 100 will extend between adjacent curvilinear tynes 97 to positions thereabove during their rotation. An extension 101 of the transversely extending, longitudinal shaft 98, situated exteriorly of the vertical plate at the same side of the silage loader, fixedly supports a sprocket wheel 102 by employment of which said transversely extending, horizontal shaft can be rotated.

Opposite end portions of extensions 106 of a transverse and horizontal shaft 103 are rotatably mounted in upwardly and forwardly extending elongated slots 104 in intermediate upper portions of the vertical plates 81, respectively, at elevation somewhat above the curvilinear tynes 97 and about in the vertical plane of rearward upper ends of the bracket members 95. Upper feed fingers 105 integral with the horizontal shaft 103 are to be rotated therewith as a unit in the direction of the arrows in Fig. 4. Said upper feed fingers will extend to down positions where in predetermined spaced relation to forward portions of upper surfaces of the curvilinear tynes 97 during their rotation. One of the extensions 106 of the transversely extending, horizontal shaft 103, situated exteriorly of the vertical plate at the same side of the silage loader, fixedly supports a sprocket wheel 107 by employment of which said transversely extending, horizontal shaft 103 can be rotated.

Mechanism for accomplishing revolution of the rotary cutters 90, the lower feed fingers 100 and the upper feed fingers 105 includes an hydraulic motor 108, suitably and conveniently fixed on one of the vertical plates 81, having a driven shaft 109, a sprocket wheel 110 fixed on said driven shaft, and a sprocket chain 111 riding said sprocket wheel 110 and also riding the sprocket wheels 91 and 102. The sprocket wheels 91, 102 and 110, as well as the sprocket chain 111, are within a casing 112 on the external surface of the vertical plate at the same side of the silage loader. A gear 113 fixed on the driven shaft 109, at the interior side of the adjacent vertical plate 81, meshes with a gear 114 fixed on an end portion of a suitably and conveniently mounted transverse stub shaft 115. Said transverse stub shaft fixedly supports a sprocket wheel 116, and a sprocket chain 117 riding said sprocket wheel also rides a sprocket wheel 118 fixed on an extension 106 of the transverse shaft 103. The gears 113, 114, the sprocket wheels 116, 118 and the sprocket chain 117 are within a casing 119 on the internal surface of the vertical plate at the same side of said silage loader.

Hoses 120 lead from the pump 20 by way of the control station 45 to the hydraulic motor 108 for rotating the driven shaft 109, together with the rotary cutters 90, the lower feed fingers 100 and the upper feed fingers 105 as a unit. The lever 73 at said control station will be manipulatable to a first position to establish communication between the pump and the hydraulic motor 108 when the rotary cutters and the lower and upper feed fingers are to be operative and to a second position to shut off communication between said pump and said hydraulic motor when operation of said rotary cutters and lower and upper feed fingers is to be discontinued. The rotary cutters 90 and the lower feed fingers 100 of course will be rotated through the instrumentality of the driven shaft 109, the sprocket wheel 110, the sprocket chain 111 and the sprocket wheels 91 and 102, respectively, and the upper feed fingers 105 will be rotated by said driven shaft through the instrumentality of the gears 113, 114, the transverse stub shaft 115, the sprocket wheels 116 and 118 and the sprocket chain 117.

A seat 121 for an operator of the silage loader will be supported on the vehicle at a location where the control levers will be conveniently accessible, and a platform for the feet of the operator is indicated 122.

*Operation*

In Fig. 1 of the drawings the intake assembly 59 of the silage loader is situated as when silage is to be loaded at an elevated position, and in Fig. 2 said intake assembly is situated as when silage is to be loaded at a lowered position. Evidently, the rotary cutters 90, the curvilinear tynes 97, the lower and upper feed fingers 100 and 105, the blower housing 62, etc., of the intake assembly can be vertically adjusted to any elevation which may be selected merely by vertically adjusting the boom members 51 in the manner as hereinbefore set forth. Also, said intake assembly can be adjusted transversely of the silage loader merely by adjusting said blower housing with appurtenances longitudinally of the lateral support 58 in the manner as set forth. In practical operation, the construction and arrangement desirably will be such that the silage loader can enter between spaced walls where silage is stacked up, and the intake assembly of said silage loader will be vertically and transversely adjustable to be capable of efficiently scooping up all of the silage with which the whole of the width of said intake assembly is longitudinally alined. The manner in which the silage will be removed from the ground and deposited into the storage box 13 will be substantially the same regardless of the position of vertical or transverse adjustment of the intake assembly.

When silage is to be picked up the trailer or other vehicle will be conveyed to a position at a side of the pile or stack as in Figs. 1 and 2. In the disclosure as made, the trailer 10 is to be backed up to the pile. A transporting vehicle with storage box for the silage could, however, be advanced to the pile under its own power.

Assuming that the silage loader has been conveyed to a location where the intake assembly thereof is properly situated to scoop up a load and deposit it into the storage box of said silage loader, a first procedure in the gathering of the load would be the forcible movement of the rotary cutters 90 and the curvilinear tynes 97 into the silage, rearwardly of the trailer 10 as disclosed, while said rotary cutters and the lower and upper feed fingers 100 and 105 were being forcibly rotated. Forcible outward movement, rearwardly as shown, of the intake assembly is accomplishable merely by forcibly moving the boom members 51, together with the intake assembly as a unit, rearwardly in the manner as has been stated. The rotary cutters 90 will vertically slice the surface of the silage and as said rotary cutters while revolving progressively more outwardly of the trailer or other vehicle the exterior end portions of the curvilinear tynes 97 will scoop under a layer of silage between the rotary cutters thus to sever a swath which will be forced inwardly up along said curvilinear tynes by reason of their progressive forced outward movement beneath the swath. As silage reaches the location of the lower feed fingers 100 it will become broken up and forcibly propelled along the upper surfaces of the interior end portions of the curvilinear tynes 97 whence silage will or can fall onto the finger piece 93 of the slotted apron 92. Inward passage of the silage will be aided by the upper feed fingers 105 which will act to push or throw silage toward the open side 68 of the blower housing 62. Said upper feed fingers are mounted to be capable of being moved bodily upwardly and inwardly thus to permit passage of silage in mass without liability of clogging. Upon completion of the severance of each swath of silage the vertical plates 81, with appurtenances desirably can be swung upwardly, from the position as in full lines to the position as in dotted lines in Fig. 2, of the drawings, to the end that the whole of the scooped up swath of silage will be dumped into the blower housing, merely in response to actuation of the pistons 84 in the manner as hereinbefore described. Said vertical plates with appurtenances, will be returned to normal operative position upon completion of dumping in the manner set forth.

Silage deposited into the blower housing obviously will be forced by the blower blades 75 into and through the discharge spout to become deposited by gravity into the storage box. Said storage box when fully or partially loaded is to be transported, together with the intake assembly as a unit, to locations where to be unloaded. The flights 15 will be actuated to convey the silage into the screw propeller whence said silage can be transported to and placed in storage spaces which may be appropriate, as for example, in the storage spaces of silos.

Scoops of silage, each constituted as a swath, will be successively removed from the ground. Desirably, after a swath at the top of the pile has been loaded onto the intake assembly and deposited into the storage box, said intake assembly can be retracted and then adjusted laterally to be situated to create and scoop up a next adjacent swath and the process continued for the whole width of the pile. When top transverse layers the width of the pile shall have been scooped up the transverse layers immediately beneath can be similarly operated upon. Removale of swaths of silage from the ground by employment of the silage loader obviously can be accomplished in sequence other than as herein suggested.

What is claimed is:

1. In combination, a wheel supported vehicle, a silage receiving box on the vehicle open at its top and closed at its bottom, longitudinally extending supporting beams mounted on the vehicle at each of opposite sides, respectively, of said box for upward and downward movement, mechanism for raising and lowering said supporting beams while maintained in horizontal and transverse alinement, longitudinally extending boom members, means mounting said boom members on said supporting beams for movement forwardly and rearwardly of said vehicle, mechanism for accomplishing forward and rearward movement of the boom members while maintained in alinement transversely of the vehicle, a lateral support disposed at an end of and exteriorly of said box rigid with at least one of said boom members, a blower housing mounted on said lateral support, a discharge spout mounted on and leading from an interior portion of said blower housing to a location above the open top of said box, propeller means in the blower housing in contiguous relation to an open side thereof opposite the discharge spout for delivering silage from said blower housing into and through said discharge spout, the blower housing with discharge spout constituting a part of an intake assembly for silage.

2. The combination as specified in claim 1, and a hydraulic motor for actuating said propeller means.

3. In combination, a wheel supported vehicle, a silage receiving box on the vehicle open at its top and closed at its bottom, longitudinally extending supporting beams mounted on the vehicle at each of opposite sides, respectively, of said box for upward and downward movement, mechanism for raising and lowering said supporting beams while maintained in horizontal and transverse alinement, longitudinally extending boom members, means mounting said boom members on said supporting beams for movement forwardly and rearwardly of said vehicle, mechanism for accomplishing forward and rearward movement of the boom members while maintained in alinement transversely of the vehicle, a lateral support disposed at an end of and exteriorly of said box rigid with at least one of said boom members, a blower housing mounted on said lateral support to be movable transversely of the vehicle, a discharge spout mounted on and leading from an interior portion of said blower housing to a location above the open top of said box, mechanism for accomplishing movement of the blower housing with discharge spout transversely of the vehicle, propeller means in the blower housing in contiguous relation to an open side thereof opposite the discharge spout for delivering silage from said blower housing into and through said discharge spout, the blower housing with discharge spout constituting a part of an intake assembly for silage also including as parts thereof an apron rigid with said blower housing adjacent to and extending exteriorly from its open side, a longitudinally extending frame having an interior end thereof rotatably mounted on said blower housing opposite said discharge spout for upward and downward swinging movement of said frame, transversely spaced vertical rotary cutters mounted on an exterior end portion of the frame and transversely spaced, longitudinally extending tynes rigid with said frame, interior end portions of said tynes being in overlying relation to the apron on the blower housing and exterior end portions of the tynes being situated between and substantially at the elevation of lower portions of the peripheries of said rotary cutters, mechanism for causing said frame to be swung upwardly and downwardly, and means for revolving said rotary cutters.

4. The combination as specified in claim 3 wherein said intake assembly also includes lower and upper feed fingers for advancing silage interiorly along said longitudinally extending tynes, and means for rotating said lower and upper feed fingers.

5. The combination as specified in claim 4, and an hydraulic motor for actuating said means for revolving said rotary cutters and said means for rotating said lower and upper feed fingers.

6. The combination as specified in claim 3, and an hydraulic motor for actuating said means for revolving said rotary cutters.

7. The combination as specified in claim 3 wherein each of said mechanisms for raising and lowering said supporting beams, for accomplishing forward and rearward movement of said boom members, for accomplishing movement of said blower housing with discharge spout transversely of the vehicle and for causing said frame to be swung upwardly and downwardly includes a cylinder with piston as parts thereof.

8. The combination as specified in claim 3 wherein each of said propeller means and said means for revolving said rotary cutters is actuated by an hydraulic motor.

9. In combination, a wheel supported vehicle, pump means thereon to be actuated, a silage receiving box on the vehicle open at its top and closed at its bottom, means actuable to cause silage to be ejected from said box, a first hydraulic motor for actuating said means, a first hose connection leading from said pump means to said first hydraulic motor, means for selectively affording and shutting off communication between the pump means and the first hydraulic motor by way of said first hose connection, longitudinally extending supporting beams mounted on the vehicle at each of opposite sides, respectively, of said box for upward and downward movement, mechanism for raising and lowering said supporting beams while maintained in horizontal and transverse alinement including a first cylinder with piston, a second hose connection leading from said pump means to said first cylinder, means to be manipulated to a first position to cause fluid under pressure to be forced by way of said second hose connection into said first cylinder beneath its piston to cause the supporting beams to be adjustably raised and to a second position to cause pressure to be controllably relieved in the first cylinder beneath its piston whereby to permit said supporting beams to become adjustably lowered by gravity, longitudinally extending boom members, means mounting said boom members on said supporting beams for movement forwardly and rearwardly of said vehicle, mechanism for accomplishing forward and rearward movement of the boom members while maintained in alinement transversely of the vehicle including a second cylinder with piston, third hose connections leading from said pump means to said second cylinder, means to be manipulated to a first position to cause fluid under pressure to be forced by way of said third hose connections into the second cylinder at the forward side of its piston when the boom members are to be forcibly moved rearwardly and to a second position to cause fluid under pressure to be forced by way of the third hose connection into said second cylinder at the rearward side of its piston when said boom members are to be forcibly moved forwardly, a lateral support disposed at an end and exteriorly of said box rigid with at least one of said boom members, a blower housing mounted on said lateral support to be movable transversely of the vehicle, a discharge spout mounted on and leading from an interior portion of said blower housing to a location above the open top of said box, mechanism for accomplishing movement of the blower housing with discharge spout transversely of the vehicle including a third cylinder with piston, fourth hose connections leading from said pump means to said third cylinder, means to be manipulatable to first and second positions to cause fluid under pressure selectively to be controllably forced into the third cylinder at either side of its piston thus to cause said blower housing with discharge spout to be adjustably forcibly moved longitudinally of the lateral support, propeller means in the blower housing in contiguous relation to an open side thereof opposite the discharge spout for delivering silage from said blower housing into and through said discharge spout, a second hydraulic motor for actuating said propeller means, a fifth hose connection from said pump means to said second hydraulic motor, means for selectively affording and shutting off communication between the pump means and the second hydraulic motor by way of said fifth hose connection, the blower housing with discharge spout constituting a part of an intake assembly for silage also including as parts thereof an apron rigid with said blower housing adjacent to its open side, a longitudinally extending frame having an interior portion thereof rotatably mounted on said blower housing opposite said discharge spout for upward and downward swinging movement of said frame, transversely spaced, vertical rotary cutters mounted on an exterior end portion of the frame and transversely spaced, longitudinally extending tynes rigid with said frame, interior end portions of said tynes being in overlying relation to the apron on the blower housing and exterior end portions of the tynes being situated between and substantially at the elevation of lower portions of the peripheries of said rotary cutters, mechanism for causing said frame to be swung upwardly and downwardly including a fourth cylinder with piston operatively connected between said blower housing and an upper interior portion of said frame, a sixth hose connection from said pump means to said fourth cylinder, means to be manipulated to a first position to cause fluid under pressure to be forced by way of said sixth hose connection into said fourth cylinder at a first side of its piston to cause the frame to be swung upwardly and to a second position to cause pressure to be relieved in the fourth cylinder at a second side of its piston whereby to permit said frame with appurtenances to become lowered by gravity, means for revolving said rotary cutters, a third hydraulic motor for actuating said revolving means, a seventh hose connection from said pump means to said third hydraulic motor, and means for selectively affording and shutting off communication between the pump means and the third hydraulic motor by way of said seventh hose connection.

10. The combination as specified in claim 9 wherein said intake assembly also includes lower and upper feed fingers for advancing silage interiorly along said longitudinally extending tynes, and means for rotating said lower and upper feed fingers to be actuated by said third hydraulic motor.

11. The combination with a tractor including a power take-off and a wheel supported vehicle to be hitched to said tractor to be propelled thereby, of pump means on said vehicle to be actuated by said power take-off, a silage receiving box on the vehicle open at its top and closed at its bottom, means actuable to cause silage to be ejected from said box, a first hydraulic motor for actuating said means, a first hose connection leading from said pump means to said first hydraulic motor, means for selectively affording and shutting off communication between the pump means and the first hydraulic motor by way of said first hose connection, longitudinally extending supporting beams mounted on the vehicle at each of opposite sides, respectively, of said box for upward and downward movement, mechanism for raising and lowering said supporting beams while maintained in horizontal and transverse alinement including a first cylinder with piston, a second hose connection leading from said pump means to said first cylinder, means to be manipulated to a first position to cause fluid under pressure to be forced by way of said second hose connection into said first cylinder beneath its piston to cause the supporting beams to be adjustably raised and to a second position to cause pressure to be controllably relieved in the first cylinder beneath its piston whereby to permit said supporting beams to become adjustably lowered by gravity, longitudinally extending boom members, means mounting said boom members on said supporting beams for movement forwardly and rearwardly of said vehicle, mechanism for accomplishing forward and rearward movement of the boom members while maintained in alinement transversely of the vehicle including a second cylinder with piston, third hose connections leading from said pump means to said second cylinder, means to be manipulated to a first position to cause fluid under pressure to be forced by way of said third hose connections into the second cylinder at the forward side of its piston when the boom members are to be forcibly moved rearwardly and to a second position to cause fluid under pressure to be forced by way of said third hose connections into said second cylinder at the rearward side of its piston when said boom members are to be forcibly moved forwardly, a lateral support disposed at an end and exteriorly of said box rigid with at least one of said boom members, a blower housing mounted on said lateral support to be movable transversely of the vehicle, a discharge spout mounted on and leading from an interior portion of said blower housing to a location above the open top of said box, mechanism for accomplishing movement of the blower housing with discharge spout transversely of the vehicle including a third cylinder with piston, fourth hose connections leading from said pump means to said third cylinder, means to be manipulatable to first and second positions to cause fluid under pressure selectively to be controllably forced into the third cylinder at either side of its piston thus to cause said blower housing with discharge spout to be adjustably forcibly moved longitudinally of the lateral support, propeller means in the blower housing in contiguous relation to an open side thereof opposite the discharge spout for delivering silage from said blower housing into and through said discharge spout, a second hydraulic motor for actuating said propeller means, a fifth hose connection from said pump means to said second hydraulic motor, means for selectively affording and shutting off communication between the pump means and the second hydraulic motor by way of said fifth hose connection, the blower housing with discharge spout constituting a part of an intake assembly for silage also including as parts thereof an apron rigid with said blower housing adjacent to its open side, a longitudinally extending frame having an interior portion thereof rotatably mounted on said blower housing opposite said discharge spout for upward and downward swinging movement of said frame, transversely spaced, vertical rotary cutters mounted on an exterior end portion of the frame and transversely spaced, longitudinally extending tynes rigid with said frame, interior end portions of said tynes being in overlying relation to the apron on the blower housing and exterior end portions of the tynes being situated between and substantially at the elevation of lower portions of the peripheries of said rotary cutters, mechanism for causing said frame to be swung upwardly and downwardly including a fourth cylinder with piston operatively connected between said blower housing and an upper interior portion of said frame, a sixth hose connection from said pump means to said fourth cylinder, means to be manipulated to a first position to cause fluid under pressure to be forced by way of said sixth hose connection into said fourth cylinder at a first side of its piston to cause the frame to be swung upwardly and to a second position to cause pressure to be relieved in the fourth cylinder at a second side of its piston whereby to permit said frame with appurtenances to become lowered by gravity, means for revolving said rotary cutters, a third hydraulic motor for actuating said revolving means, a seventh hose connection from said pump means to said third hydraulic motor, and means for selectively affording and shutting off communication between the pump means and the third hydraulic motor by way of said seventh hose connection.

12. The combination as specified in claim 11 wherein said intake assembly also includes lower and upper feed fingers for advancing silage interiorly along said longitudinally extending tynes, and means for rotating said lower and upper feed fingers to be actuated by said third hydraulic motor.

References Cited in the file of this patent
UNITED STATES PATENTS 2,717,812     Eglitis _____ Sept. 13, 1955
2,877,057     Buman _____ Mar. 10, 1959